A. G. PORTEE.
NUT LOCK.
APPLICATION FILED JUNE 6, 1917.

1,254,726. Patented Jan. 29, 1918.

Arthur G. Portee
Inventor

Witness

By
Attorneys

UNITED STATES PATENT OFFICE.

ARTHUR G. PORTEE, OF CHARLESTON, ILLINOIS.

NUT-LOCK.

1,254,726.  Specification of Letters Patent.  Patented Jan. 29, 1918.

Application filed June 6, 1917. Serial No. 173,151.

*To all whom it may concern:*

Be it known that I, ARTHUR G. PORTEE, a citizen of the United States, residing at Charleston, in the county of Coles and State of Illinois, have invented a new and useful Nut-Lock, of which the following is a specification.

This invention relates to improvements in nut locks, one of its objects being to provide means whereby a nut can be held securely to a bolt so that it will not unscrew, although it is possible to turn the nut upon the bolt in one direction to take up play.

A further object is to provide a lock which can be readily disengaged from the bolt, thus to permit the nut to be removed easily.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made without departing from the spirit of the invention.

Figure 1:
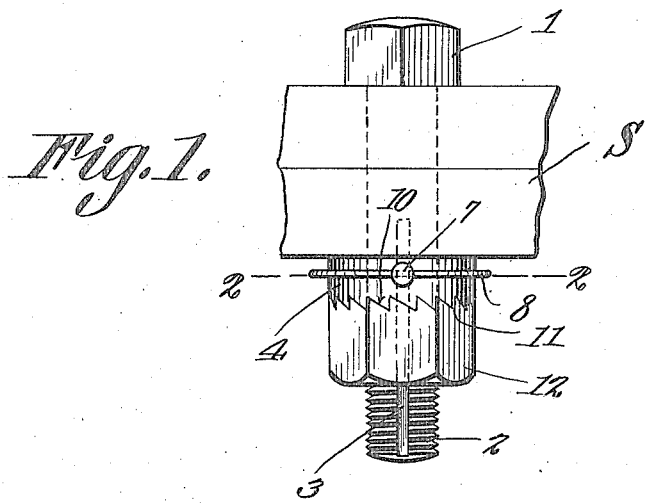
Figure 1 is a plan view of the structure constituting the present invention.
Figure 2:
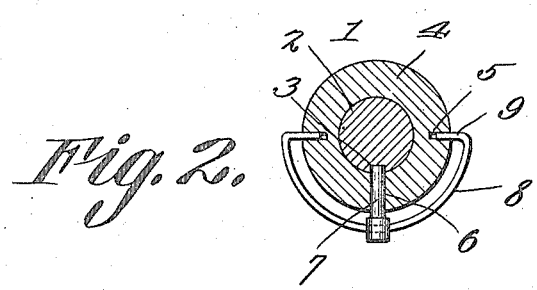
Fig. 2 is a section on line 2—2 Fig. 1.

Referring to the figures by characters of reference 1 designates a bolt adapted to be inserted through a structure indicated as S, the threaded portion of the bolt being provided with a longitudinal groove 3 which intersects the threads. Slidably mounted on the threaded portion of the bolt is a base washer 4 having diametrically opposed recesses 5 and, between said recesses, having a radial opening 6. A holding pin 7 is slidably mounted in the opening 6 and extending through the outer end portion of the pin is a spring bail 8 the ends of which are inturned as at 9 and detachably seated in the recesses 5. When these inturned ends are thus seated, they serve to hold the pin 9 projected inwardly from the base washer 4 so as to be seated within the groove 3.

The base washer is provided on one face with ratchet teeth 10 adapted to engage corresponding teeth 11 formed on a nut 12 engaging the threaded portion 2 of the bolt.

It is to be understood that when the nut is to be screwed onto the bolt, the base washer 4 is slipped on the bolt so that the inner end of pin 7 will enter and slide along the groove 3. Nut 12 is then placed in engagement with the threaded end of the bolt and when screwed onto the bolt this nut will slip over the teeth 10 on the base washer and gradually press the base washer toward and against structure S. The teeth on the base washer and nut will of course prevent the nut from unscrewing after the base washer has been forced against the structure S and the only way in which the nut can then be removed is by forcing the end portions of bail 8 outwardly so that the terminals 9 will be withdrawn from recesses 5. Pin 7 can then be removed and the base washer can be unscrewed with the nut until the teeth on the base washer and nut become disengaged.

What is claimed is:

1. In a nut lock the combination with a bolt having a longitudinal groove in the threaded end portion thereof, of a base washer slidably mounted on the bolt, said washer having ratchet teeth, a nut engaging the threaded portion of the bolt and having teeth for engaging the teeth on the base washer, a locking pin extending through the washer and into the groove in the bolt, yieldable and detachable means for holding the pin to the base washer.

2. In a nut lock the combination with a bolt having a longitudinal groove in the threaded end portion thereof, of a base washer slidably mounted on the bolt, said washer having ratchet teeth, a nut engaging to the threaded portion of the bolt and having teeth engaging the teeth on the base washer, a locking pin extending into the washer and into the groove in the bolt, and yieldable and detachable means for holding the pin to the base washer, said holding means including a resilient bail having inturned terminals projecting into opposed portions of the base washer.

In testimony that I claim the foregoing as my own, I have hereto affixed my signature in the presence of two witnesses.

ARTHUR G. PORTEE.

Witnesses:
W. K. SHOEMAKER,
W. O. GLASSER.

Copies of this patent may be obtained for five cents each, by addressing the "Commissioner of Patents, Washington, D. C."